United States Patent [19]

Fawcett

[11] 3,789,423

[45] Jan. 29, 1974

[54] DIRECT WRITING RECORDER INCLUDING AN IMPROVED STYLUS ASSEMBLY THEREFOR

[75] Inventor: Howard Fawcett, Briarcliff Manor, N.Y.

[73] Assignee: Cambridge Instrument Company, Inc., Ossining, N.Y.

[22] Filed: Dec. 6, 1971

[21] Appl. No.: 205,027

[52] U.S. Cl. .......................... 346/76 R, 346/139 C

[51] Int. Cl. .......................................... G01d 15/10

[58] Field of Search. 346/76 R, 139 C, 282; 178/20, 178/18, 19, 87, 15

[56] References Cited

UNITED STATES PATENTS

| | | | |
|---|---|---|---|
| 2,739,030 | 3/1956 | Kruse | 346/76 |
| 3,427,635 | 2/1969 | Siegelman | 346/139 |
| 3,334,352 | 4/1967 | Abbondante | 346/76 |
| 3,104,930 | 9/1963 | Scheuzger | 178/20 |
| 3,500,379 | 3/1970 | Gibbons et al. | 178/18 |
| 2,446,392 | 8/1948 | Rey | 178/19 |

*Primary Examiner*—William C. Cooper
*Attorney, Agent, or Firm*—Eugene E. Geoffrey, Jr.

[57] ABSTRACT

A direct writing recorder having driving means, an arm carried by the driving means and having a cross-sectional area which gradually diminishes from a point adjoining the driving means to its apex, a stylus carried at the apex of the arm and a curved platen carrying the recording medium over which the stylus moves in recording electrical signals.

16 Claims, 8 Drawing Figures

INVENTOR
HOWARD FAWCETT
BY [signature]
ATTORNEY

INVENTOR
HOWARD FAWCETT
BY [signature]
ATTORNEY

PATENTED JAN 29 1974 3,789,423

INVENTOR
HOWARD FAWCETT
BY [signature]
ATTORNEY

DIRECT WRITING RECORDER INCLUDING AN IMPROVED STYLUS ASSEMBLY THEREFOR

This invention relates to direct writing recorders and more specifically to a novel and improved recorder and stylus assembly therefor.

While direct writing recorders are generally well known and are widely used in many fields, recording devices for use in the medical field and particularly in electrocardiographic apparatus must have a high degree of precision in order to provide a faithful reproduction of the signals. One of the difficulties heretofore encountered with known apparatus has resided in the stylus assembly and more particularly the stylus supporting arm. In direct writing recorders the stylus must engage the record, and to overcome the friction as well as the mass of the stylus, the supporting arm must have adequate rigidity to prevent bending. The tendency for the stylus supporting arm to bend obviously increases with frequency and of course results in distortion of the reproduced wave form. Furthermore, in many stylus supporting arms, the mass is spaced an appreciable distance from the supporting and driving means and, therefore, further contributes to the tendency of the arm to bend.

This invention provides a vastly improved stylus and supporting arm for direct writing recorders which affords an exceedingly high degree of rigidity while at the same time having a very small moment of inertia. Moreover, since the arm must necessarily have some mass, it is proportioned so that the mass of any discrete section is inversely proportional to its distance from the supporting and driving means. Such a structure affords a still additional advantage in that it results in a reduction of torque required to move the arm with the result that a substantially increased frequency range can be faithfully and precisely recorded.

Another aspect of the invention resides in the provision of an improved cylindrical hub for coupling the stylus supporting arm to a drive motor shaft which facilitates adjustment of the stylus relative to the recording medium without materially affecting the mass of the system which would adversely affect the accuracy of the recorder.

A further aspect of the invention resides in the utilization of a motor embodying feed back means and driven by a servo amplifier for driving the stylus assembly in accordance with the invention. The use of this improved driving means in combination with the stylus assembly provides extremely accurate reproduction of electric signals at frequencies of the order of 150 to 200 Hz.

A still further object of the invention resides in the provision of a novel and improved stylus assembly having a relatively small moment of inertia in combination with a curved platen for supporting the recording medium which eliminates distortion produced by the use of an arm moving in an arcuate path on a plane surface.

Still another aspect of the invention resides in the provision stylus assembly and driving means therefor for use in direct writing recorders.

The objects of the invention are attained through the use of a hollow conical arm which may either be a true cone or be of eliptical section and wherein the base of the cone is secured to the driving means and the recording stylus is curved at the apex. Moreover, the platen carrying the recording medium has a curvature substantially equal to the curvature of the stylus path. A servo controlled drive motor is utilized to drive the arm and stylus.

The above and other objects and advantages of the invention will become more apparent from the following description and accompanying drawings forming part of this application. In the drawings.

Figure 1:
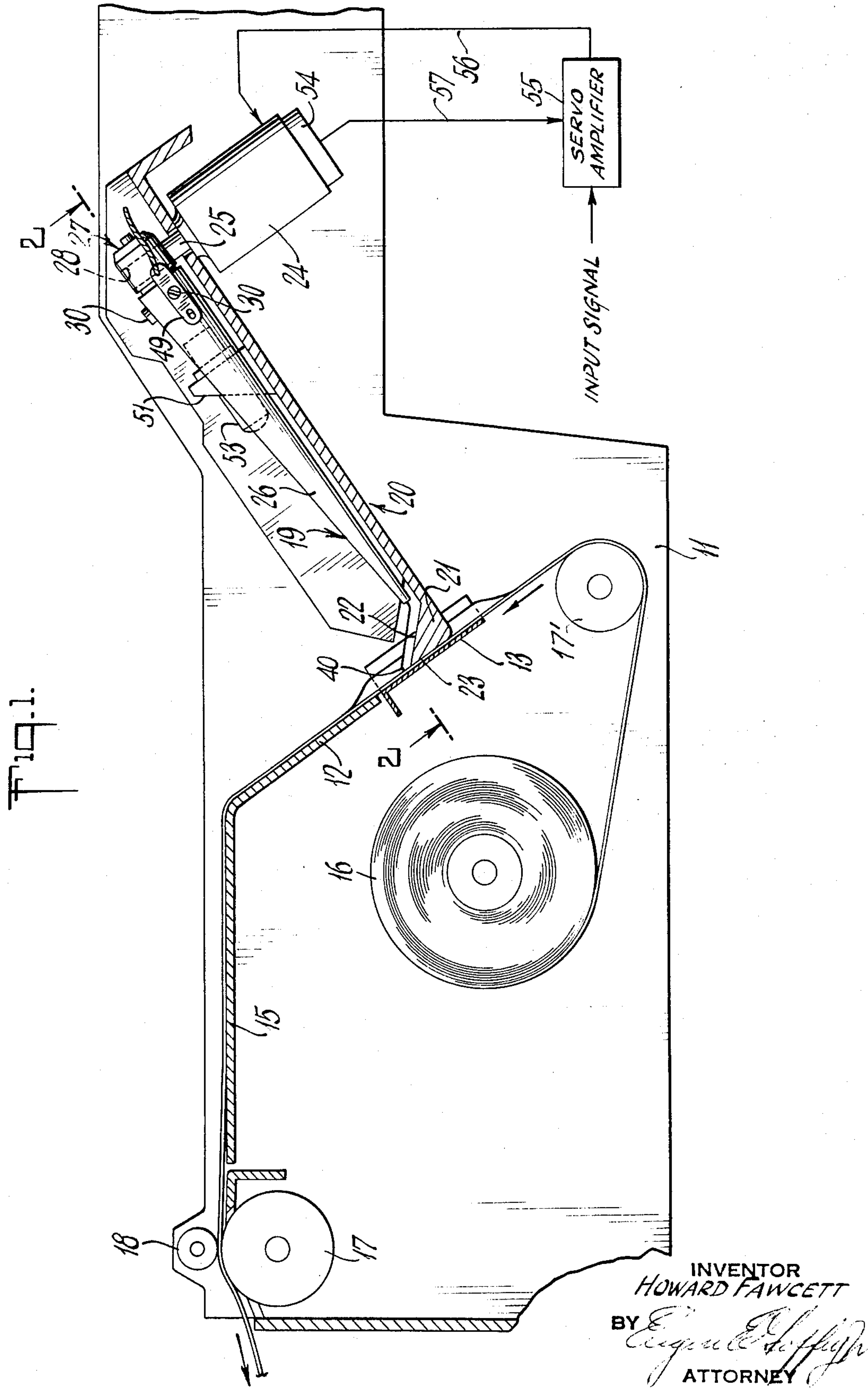
FIG. 1 is a side elevational view in partial section of a direct writing recorder embodying a stylus assembly and driving means therefor in accordance with the invention.
Figure 2:
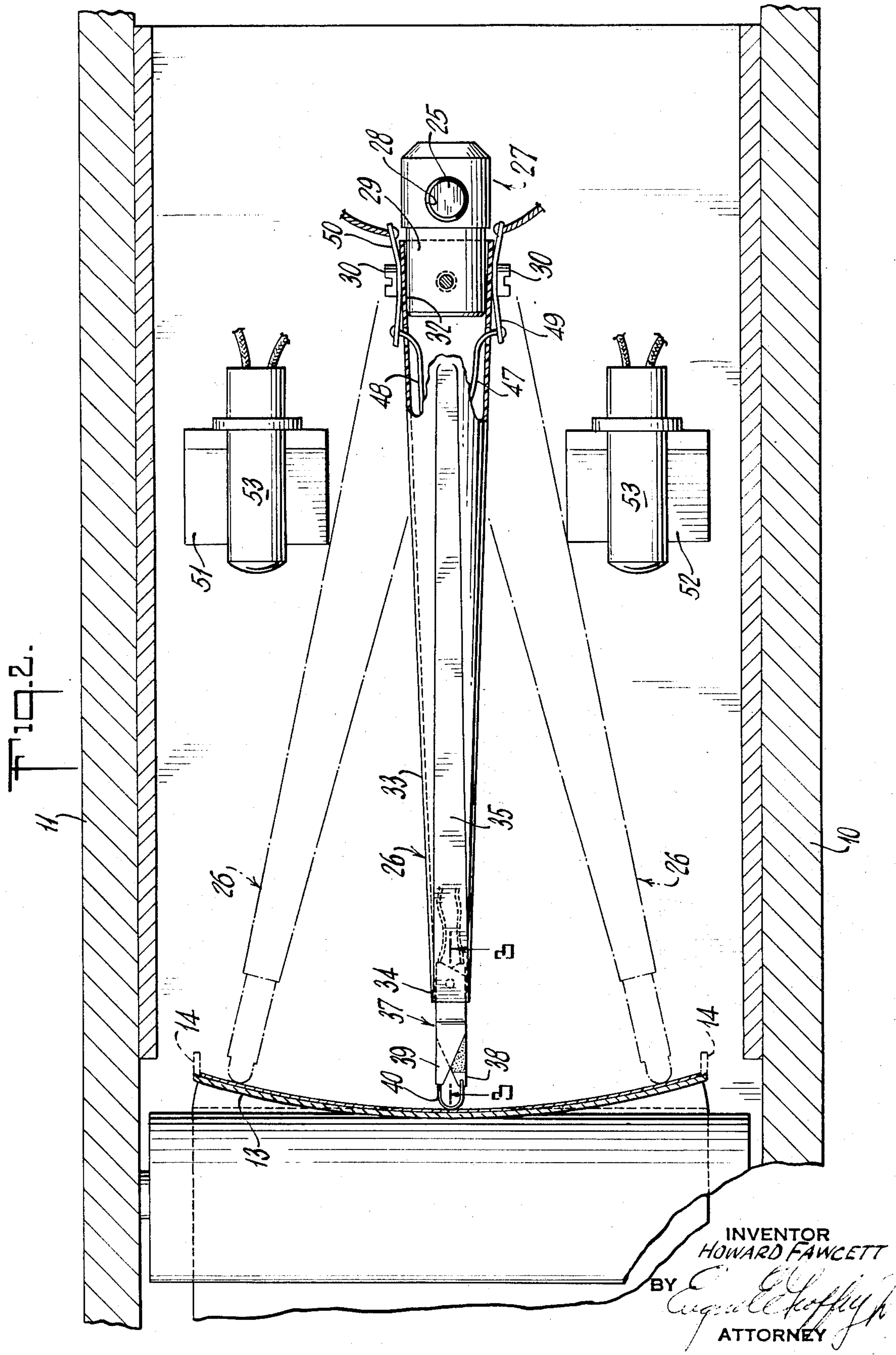
FIG. 2 is a cross-sectional view of FIG. 1 taken along the line 2—2 thereof.

One form of direct writing recorder in accordance with the invention is shown in FIGS. 1 and 2. It includes side frame members 10 and 11, an angularly disposed platen 12 having a curved portion 13 include side guides 14 and a horizontal support 15. The recording medium, in the form of a roll of heat responsive sheet material 16, is carried by the side frames 10 and 11. The material is fed about an idler roll 17', upwardy along the platen sections 12 and 13, over the support 15 and through the nip formed by rollers 17 and 18 at least one of which is driven at a predetermined speed coordinated with transverse timing lines which may be preprinted on the recording paper 16.

The stylus assembly generally denoted by the numeral 19 is carried by an inclined plate 20 positioned at approximately 90° to the platen 12. The left edge of the plate 20 as viewed in FIGS. 1 and 2 terminates in a triangularly shaped portion 21 having a substantially horizontal top surface 22 and a leading surface 23 spaced from the platen 12 a distance sufficient to permit the recording medium 16 to pass therethrough. The surface 23 is also curved, as will be observed in FIG. 2, to conform with the curved platen portion 13. The curvature of the platen 13 is determined by the length of the stylus assembly which moves through an arc normal to the platen. In this way angular distortion of the reproduced signal is avoided.

The stylus assembly 19 includes a servo controlled motor 24 having a shaft 25 extending through the plate 20. The stylus arm 26 is of generally conical configuration and is secured to the shaft 25 by a connecting member 27 having an inclined opening 28 engaging shaft 25 and a cylindrical shank 29 slidably engaging the conical arm 26. The inclination of the opening 28 is coordinated with the taper of the arm 26 so that the underside of the arm lies in a plane parallel to the surface of the 20. The arm 26 is secured to the shank 29 by screws 30 which engage elongated openings in the arm and thereby permit longitudinal adjustment thereof. While the arm 26 is generally of conical configuration, it may be of eliptical section. Accordingly, the term conical is intended to cover cones of circular, eliptical, and other preferably hollow sections.

The conical arm 26 is preferably formed of thin insulating material and has a cylindrical section 32, a conical section 33 and a flattened end portion 34. The flattened end portion is formed by providing upper and lower flattened surfaces 35 and 36 which may be observed more clearly in FIGS. 2 and 7. These surfaces taper outwardly from the enlarged portion of the conical section 33 to the flattened end portion 34. The taper of the arm 26 and the flattened surfaces 35 and 36 are preferably arranged to provide a substantially uniform change in circumference throughout the length of the arm. This arrangement facilitates fabrication of the arm, particularly when formed of thin sheets of plastic containing glass fibers. By forming a mandrel having the proper contour, the sheets can be wound evenly about it and then cured to form a rigid thin walled arm having relatively low mass. Moreover, since the mass of any given section of the arm is inversely proportional to its distance from the shaft 25 of the servo motor 24, the moment of inertia is very small and will permit the arm to be moved accurately at relatively high frequencies. At the same time, the arm 26 has a high degree of rigidity in the plane of motion.

Figures 3, 4, 5, 6:
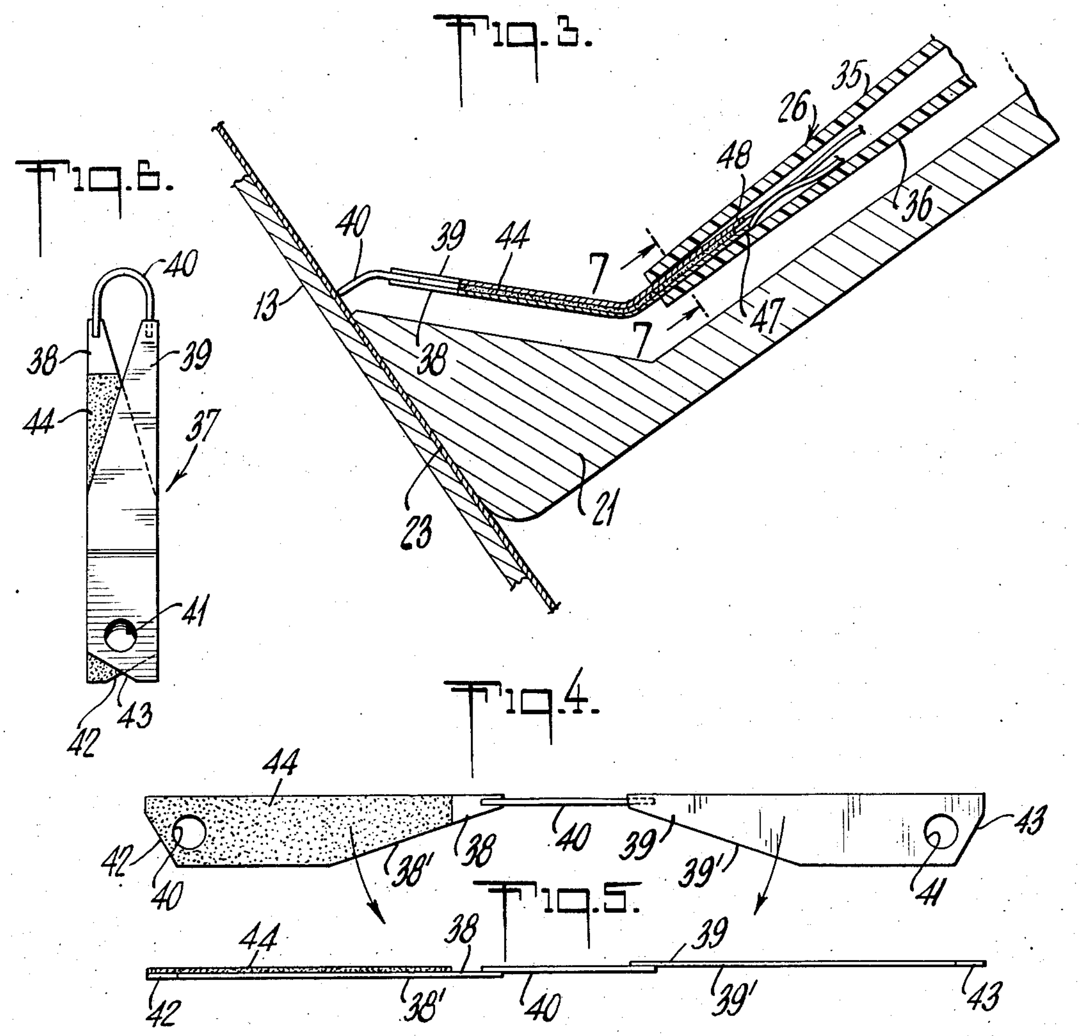
FIG. 3 is a cross-sectional view of FIG. 2 taken along the line 3—3 thereof.
FIG. 4 is an enlarged plan view of one step in the construction of the stylus in accordance with the invention.
FIG. 5 is a side elevational view of the stylus structure shown in FIG. 4.
FIG. 6 is a plan view of the completed stylus prior to attachment to the supporting arm.
Figures 7, 8:
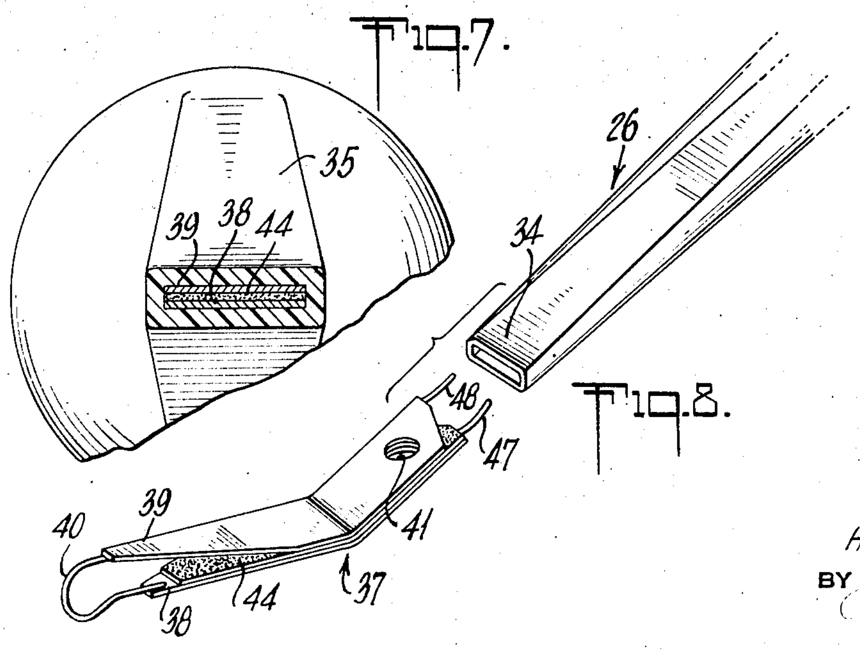
FIG. 7 is an enlarged cross-sectional view of FIG. 3 taken along the line 7—7 thereof.
FIG. 8 is a perspective view of the stylus and a fragmentary portion of the supporting arm illustrating the mode of attachment of the stylus to the arm.

The stylus structure 37 carried by the end of the arm 26 is shown more clearly in FIGS. 3 through 8. The structure is fabricated by forming two metal plates 38 and 39 having tapered portions 38' and 39'. A thin piece of resistance wire 40 is secured by welding or other suitable means in electrical conducting relationship to the narrowed end portions of the plates 38 and 39 as shown in FIG. 4. The plates are also provided with aligning openings 40 and 41 and tapered outer ends 42 and 43. A layer of epoxy or other suitable adhesive 44 is applied to one plate whereupon the plates are brought into overlying relationship as shown in FIG. 6 and maintained under pressure until the adhesive sets. This produces the rounded stylus 40 which can then be bent downwardly as shown in FIG. 8. The tapers 42 and 43 each expose a portion of the other plate to provide, in effect, terminal portions 45 and 46 for the attachment of wires 47 and 48 to heat the stylus 40.

The stylus assembly 37 is then shaped as shown in FIG. 8 whereupon the wires 47 and 48 are fed through the arm 26 and the stylus assembly cemented to the arm as shown more clearly in FIG. 3. The wires 47 and 48 are then fastened to lugs 49 and 50 which in turn are connected to a suitable power source to heat the stylus 40.

With the foregoing arrangement, an exceedingly rigid stylus assembly is provided having exceedingly low inertia with the result that electrical pulses fed to the motor 24 will be accurately and precisely displayed on the recording medium 16. Moreover, with the utilization of the curved platen 13 in combination with the improved stylus assembly, the traces on the recording medium will faithfully follow the changes in the electrical signals fed to motor 24 since the radius of curvature of the platen 13 is equal to the length of the stylus assembly 19. If desired, the plate 20 supporting the stylus assembly 19 may include stops 51 and 52 to limit the swing of the arm 26 and lamps 53 may be utilized to illuminate the recording medium 16.

The servo motor 24 may be of any desired type of configuration provided however that it has the desired power and frequency response. In the present embodiment, a motor having a permanent magnet rotor is utilized together with a potentiometer 54 mechanically coupled to the rotor. The signal to be recorded is fed to the input of the servo amplifier 55 and the output is fed through a cable 56 to the motor. The potentiometer 54 is connected to the amplifier through cable 57 so that displacement of the rotor will be immediately reflected back to the amplifier and thus cause the stylus assembly to precisely follow changes in the input signal.

While only one embodiment of the invention has been illustrated and described, it is apparent that alterations, modifications and changes may be made without departing from the true scope and spirit thereof as defined by the appended claims.

What is claimed is:

1. In a direct writing recorder, a stylus assembly comprising a double open ended, arm tapered continuously from its base to its apex said arm being of unitary construction terminating at said apex in a small, substantially rectangular opening and at the base in a relatively large circular opening, said arm having diametrically opposed flattened portions extending from said apex to a point spaced from the base, said flattened portions forming the upper and lower sides of said rectangular opening, and rounded side portions integrally joined with said flattened portions throughout their lengths and extending beyond said flattened portions, the arcuate length of the extending parts of said rounded sides being increased to form a continuous annular base structure integrally joined with the adjoining ends of said flattened positions, driving means, means securing the base of said arm to said driving means for oscillatory motion in a plane and a stylus carried by and extending from the apex of said arm.

2. In a direct writing recorder according to claim 1 wherein the plane of one of said flattened portions is substantially normal to the axis of oscillation of said driving means.

3. In a direct writing recorder according to claim 1, a curved platen, a recording medium, and means guiding said recording medium along the curved platen, the radius of curvature of said platen being substantially equal to the radius of curvature of the path of movement of said stylus.

4. In a direct writing recorder, a stylus assembly comprising a double open ended continuously tapered hollow conical arm of unitary construction having a cross-sectional area which diminishes substantially uniformly from a circular base to a rectangular end, driving means, means securing the base of said arm to said driving means for oscillatory motion in a plane and a stylus carried by and extending from the apex of said arm, said stylus comprising a pair of thin flat metal members cemented in insulating relationship one to the other, an arcuate heating wire having each end electrically contacting and mechanically secured to one end of said metal members, and lead wires connected to the other ends of said metal members, said other ends of said metal members extending into and being adhered to the outer end of said conical arm with the lead wires extending through said arm.

5. In a direct writing recorder according to claim 4 wherein said flat metal members are bent to displace said heating wire out of the plane of movement of said arm and said heating wire is bent in a direction to place the end thereof in a plane substantially parallel to the plane of movement of said arm.

6. In a direct writing recorder according to claim 1 wherein said driving means includes a shaft, a magnetic rotor carried by said shaft and means for effecting oscillation of said shaft in response to electrical signals, a potentiometer coupled to said shaft, a servo amplifier having input, output and feed back terminals, connections between said output terminals and said feed back terminals, the electrical signals to be recorded being fed to said input terminals.

7. In a direct writing recorder, a stylus assembly comprising a double open ended continuously tapered hollow conical arm of unitary construction having a cross-sectional area which diminishes substantially uniformly from a circular base to a rectangular end, driving means, means securing the base of said arm to said driving means for oscillatory motion in a plane and a stylus carried by and extending from the apex of said arm, said driving means including a driven shaft extending therefrom, a connecting member having an opening therein for securing it to said shaft and a cylindrical portion having its axis extending approximately normal to the axis of the shaft, the base portion of said arm terminating in a cylindrical section slidably engaging the said cylindrical portion and means adjustably securing said cylindrical section to said cylindrical portion.

8. In a direct writing recorder according to claim 7 wherein said arm has a pair of diametrically opposed flattened areas extending from the outer end of said arm to points spaced from the base thereof, the planes of said flattened areas being approximately parallel to the path of motion of said arm.

9. In a direct writing recorder according to claim 8 wherein the plane of one of said flattened portions is substantially normal to the axis of oscillation of said driving means.

10. In a direct writing recorder according to claim 7, a curved platen, a recording medium, and means guiding said recording medium along the curved platen, the radius of curvature of said platen being substantially equal to the radius of curvature of the path of movement of said stylus.

11. In a direct writing recorder according to claim 7 wherein said stylus comprises a pair of thin flat metal members cemented in insulating relationship one to the other, an arcuate heating wire having each end electrically contacting and mechanically secured to one end of one of said metal members, and lead wires connected to the other ends of said metal members, said other ends of said metal members extending into and being adhered to the outer end of said conical arm with the lead wires extending through said arm.

12. In a direct writing recorder according to claim 11 wherein said flat metal members are bent to displace said heating wire out of the plane of movement of said arm and said heating wire is bent in a direction to place the end thereof in a plane substantially parallel to the plane of movement of said arm.

13. In a direct writing recorder according to claim 7 wherein said driving means includes a shaft, a magnetic rotor carried by said shaft and means for effecting oscillation of said shaft in response to electrical signals, a potentiometer coupled to said shaft, a servo amplifier having input, output and feed back terminals, connections between said output terminals and said feed back terminals, the electrical signals to be recorded being fed to said input terminals.

14. In a direct writing recorder according to claim 6, a curved platen, a recording medium, and means guiding said recording medium along the curved platen, the radius of curvature of said platen being substantially equal to the radius of curvature of the path of movement of said stylus.

15. In a direct writing recorder according to claim 6 wherein said stylus comprises a pair of thin flat metal members cemented in insulating relationship one to the other, an arcuate heating wire having each end electrically contacting and mechanically secured to one end of one of said metal members, and lead wires connected to the other ends of said metal members, said other ends of said metal members extending into and being adhered to the outer end of said conical arm with the lead wires extending through said arm.

16. In a direct writing recorder according to claim 15 wherein said flat metal members are bent to displace said heating wire out of the plane of movement of said arm and said heating wire is bent in a direction to place the end thereof in a plane substantially parallel to the plane of movement of said arm.

* * * * *